United States Patent Office 3,192,033
Patented June 29, 1965

3,192,033
METHOD OF PREPARING A SLOW RELEASE UREA FERTILIZER
Wilmer E. McCorquodale, Jr., Havertown, Pa., assignor to Sun Oil Company, Philadelphia, Pa., a corporation of New Jersey
No Drawing. Filed Feb. 6, 1964, Ser. No. 343,119
6 Claims. (Cl. 71—28)

This invention relates in one aspect to a method of forming a stable dispersion of urea in molten paraffin wax. The dispersion is stable in that the urea does not react with the molten paraffin wax to form an adduct. This reaction is prevented, and stability thus imparted to the dispersion, by incorporating into the paraffin wax a small amount of a fatty acid triglyceride. The stable dispersion is useful in that a slow release urea fertilizer can be made therefrom and the invention also relates to such slow release fertilizer compositions.

Nitrogen, potassium, and phosporous are essential elements for plant growth and commercially available fertilizers invariably contain one or more of these elements. Examples of those in frequent use at the present time include urea, ammonium nitrate, potassium chloride, sodium nitrate, monoammonium phosphate, diammonium phosphate, potassium sulfate, calcium cyanamide, potassium nitrate, superphosphate (a mixture of calcium acid phosphate and calcium sulfate), and triple superphosphate (calcium acid phosphate). Urea is a preferred source of nitrogen because it contains a higher percentage of nitrogen than the other nitrogen fertilizer compounds mentioned.

The number of fertilizer compounds applied to the soil at a given time depends mainly upon the soil analysis and the crops to be grown. In some cases only nitrogen is needed, hence only a nitrogen fertilizer is applied. In the majority of cases, however, all three of the essential elements are needed and in such cases the fertilizer actually applied to the soil is a blend of a nitrogen fertilizer, a potassium fertilizer, and a phosphorus fertilizer. Some compounds such as diammonium phosphate contain more than one essential element. A fertilizer containing all three essential elements is conventionally referred to as a complete fertilizer. It is also conventional to state the amount of each essential element in the complete fertilizer by a series of numbers which refer, in order, to the weight percentage of nitrogen (as N), phosphorus (as $P_2O_5$), and potassium (as $K_2O$) in the fertilizer. For example a 20–10–5 fertilizer contains 20% nitrogen, 10% phosphorus, and 5% potassium by weight. Fertilizers lacking an essential element are also described by this system but by conventional terminology they are not complete fertilizers. Thus a 10–0–10 fertilizer contains 10% nitrogen, no phosphorus, and 10% potassium. In addition to the above, most conventional fertilizers, whether complete or otherwise, contain some inert material in order to maintain the percentage of the essential elements present in the fertilizer at a relatively low level in an attempt to avoid excessive local concentrations of, say, nitrogen in the soil which may result in "burned" crops.

Unfortunately most of the commercial fertilizers mentioned previously are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns or crops.

One method of reducing the rate at which the fertilizer is consumed is to mix the fertilizer and molten wax, i.e., disperse the fertilizer in molten wax, form the dispersion into small particles in a mold and allow the particles to cool below the melting point of the wax. The resulting particles are a dispersion of solid fertilizer particles in solid wax. Substantially all the fertilizer particles are surrounded by and encased in wax. They can also be described as a slow release fertilizer. The water resistance of the fertilizer can be varied, by varying the amount of wax in the dispersion, so as to provide the proper rate of release of essential elements for the particular climatic conditions encountered. In areas of relatively heavy rainfall the water resistance of the fertilizer should normally be relatively high and the amount of wax in the dispersion should be relatively high. Conversely, in relatively dry areas the water resistance should be relatively low and the amount of wax in the dispersion should be relatively low.

It was mentioned previously that urea is a preferred source of nitrogen since it contains a relatively high (47%) amount of nitrogen. This feature of urea becomes especially valuable when a slow release fertilizer is prepared in the manner described above. The wax portion of the slow release fertilizer contributes no nitrogen, potassium, or phosphorus. Furthermore, the wax reduces the proportion of actual fertilizer materials in the slow release fertilizer. This being the case it becomes necessary to use fertilizer ingredients having a high content of essential elements. For this reason most slow release fertilizers will contain urea as a source of nitrogen. The actual urea content of the slow release fertilizer will vary rather widely depending upon the particular type of fertilizer. A slow release nitrogen fertilizer will normally contain a major amount of urea, i.e., more than 50% and a minor amount, i.e., less than 50%, of wax. Usually the amount of urea will be 50–80%, more frequently 50–70%, and the amount of wax will be 15–49%, more frequently 25–49%, the exact amounts depending upon climatic conditions as described above. All percentages and parts herein are by weight.

In the case of a slow release fertilizer containing a plurality of essential elements the total amount of fertilizer ingredients and the amount of wax will still normally be a major amount and a minor amount respectively, usually 50–80% and 15–49% respectively, more frequently 50–70% and 25–49% respectively, but the actual amount of urea may in some cases be relatively small. For example, a 10–10–10 complete slow release fertilizer might contain the following:

| | Percent |
|---|---|
| Urea | 21.4 |
| Triple superphosphate | 21.8 |
| Potassium chloride | 16.7 |
| Wax | 40.1 |
| | 100.0 |

A 5–15–10 complete slow release fertilizer might contain

| | Percent |
|---|---|
| Urea | 10.7 |
| Triple superphosphate | 32.6 |
| Potassium sulfate | 18.5 |
| Wax | 38.2 |
| | 100.0 |

In most cases the amount of urea will not be less than 5%. Usually it will be at least 10%, more frequently 20%. Therefore, considering both the case where the urea is the only fertilizer ingredient and the case where urea is one of a plurality of fertilizer ingredients, the amount of urea will usually be 5-80% urea, more frequently 20-70%, and the amount of wax will usually be 15-49%, more frequently 25-49%.

Although several different kinds of waxes can be used to preparer a slow release fertilizer, paraffin wax is often preferred because of its generally lower cost. However when urea is mixed, i.e., dispersed in, molten paraffin wax a difficulty is encountered. When the urea and molten paraffin wax are initially mixed, nothing unusually occurs. Shortly after mixing, however, a white precipitate forms. If the ratio of urea to molten paraffin wax is higher than 1:1, the entire mass becomes a solid having about the texture of wet sand. In this case it is extremely difficult to even remove the solid mass from the mixing vessel. The solid precipitate is not merely a physical mixture of wax and urea because when the precipitate is separated and heated to 210° F. the wax component thereof, which has a melting point of 129° F., does not melt. Analysis of the precipitate indicates that it is a urea-paraffin wax adduct having a composition of about 76% urea-24% paraffin wax. The time required for adduction, i.e., for the formation of the precipitate, varies somewhat but appears to depend mainly upon urea particle size. When commercial crystal urea, which has a particle size of mainly larger than 100 mesh (all mesh sizes are by U.S. Standard Sieves) is used, adduction generally occurs in less than 15 minutes. When urea having a particle size of 100% through 200 mesh is used, adduction generally occurs in less than 5 minutes. In any event the adduction reaction often occurs before the dispersion of urea in wax, containing other fertilizer ingredients as the case may be, can be shaped into small particles.

The solid adduct itself has some slow release properties and has been disclosed and claimed in a copending application Serial No. 308,087, filed September 11, 1963. In fact the water resistance of a urea-paraffin wax adduct is higher than the water resistance of a dispersion of urea in paraffin wax containing the same total amounts of urea and wax but in which the urea is in the unadducted form. Unfortunately, the water resistance of the adduct has sometimes been found to decrease very rapidly after prolonged contact with water. This decrease is an unpredictable phenomenon in that some batches of adduct exhibit it while other, apparently identical, batches do not. Because of this erratic behavior it is frequently preferable that the slow release fertilizer be a dispersion of solid urea in solid paraffin wax rather than a urea-paraffin wax adduct. Where such is the case a method of preventing or at least postponing the adduction reaction is necessary in order that such reaction does not occur during the time the dispersion is being processed into small particles. The present invention provides such a method.

According to the invention, reaction between urea and molten paraffin wax is prevented by incorporating, i.e., dissolving, a small amount of a fatty acid triglyceride in the molten paraffin wax. Fatty acid triglycerides, which are also known as triglycerol esters of fatty acids, can be synthesized but they also occur widely in nature and most commercially available fatty acid triglycerides are obtained from their natural source. Examples of naturally occurring triglycerides are linseed oil, tung oil, lard oil, cottonseed oil, castor oil, peanut oil, etc. Preferably for the present purpose the fatty acid triglyceride has been obtained from a natural source as opposed to being prepared synthetically. Although obtained from a natural source it can if desired be treated or modified according to conventional techniques described hereafter in which case it is still considered a natural triglyceride for the present purpose.

The structure of fatty acid triglycerides is as follows:

$$\begin{array}{l} H_2C-OOCR \\ HC-OOCR \\ H_2C-OOCR \end{array} \quad \text{(Formula I)}$$

wherein each RCOO— group represents the RCOO— group of a fatty acid having the formula RCOOH. In such a fatty acid R represents 9-29 carbon atoms in a straight chain and the COOH group is attached to an end of such chain. Including the carbon atom in the COOH group, the fatty acid thus contains 10-30 carbon atoms in a straight chain. Preferably for the present purpose the fatty acid from which the triglyceride is derived contains 14-24 carbon atoms, including the carbon atom in the COOH group, in a straight chain.

The three RCOO— groups in the triglyceride molecule can be the same or different, i.e., each triglyceride molecule can contain only one type RCOO— group or can contain two, or three different RCOO— groups. An example of a fatty acid triglyceride containing only one type RCOO— group is tristearin (glycerol tristearate). However, most naturally occurring triglycerides such as linseed oil, tung oil, etc. contain at least two different type RCOO— groups in each triglyceride molecule. Furthermore, most naturally occurring fatty acid triglycerides are actually a mixture of several individual triglycerides so that there may be, say, 5-10 different RCOO— groups present in the material.

It is conventional to identify a fatty acid triglyceride, its composition, and the RCOO— groups present therein as the fatty acids from which the RCOO— groups are derived. For example, a typical analysis of lard oil is palmitic acid 30.4%, oleic acid 41.2%, linoleic acid 5.7%, stearic acid 17.9%, and myristic acid 1.1%, all percentages and parts herein being by weight. This means that if the amount of each RCOO— group in all the triglycerides present in lard oil is converted to the equivalent amount of the corresponding fatty acid, the relative amount of each fatty acid would be as stated, the fatty acid percentages being based upon the total calculated amount of fatty acids. Some naturally occurring fatty acid triglycerides also contain a small amount of fatty acids per se, i.e., fatty acids not combined in the glyceride form. These fatty acids are conventionally referred to, and are so referred to herein, as free fatty acids.

The fatty acids in the triglyceride can be saturated or unsaturated for the present purpose. It is preferred, however, that at least 50% of the fatty acids be unsaturated fatty acids. More preferably at least 80% of the fatty acids are unsaturated. In addition, it is also preferable that the unsaturated fatty acids contain more than one double bond. Consequently, it is preferable that at least 50%, more preferably at least 80%, of the fatty acids in the triglyceride be unsaturated fatty acids containing more than one double bond. Typical unsaturated fatty acids containing more than one double bond which are frequently found in naturally occurring triglycerides are linolenic acid, linoleic acid, and eleostearic acid.

The R radicals in the triglyceride will normally contain, and preferably do contain, only carbon, hydrogen, and oxygen. This is true, of course, because the R radical in a fatty acid of the formula RCOOH will normally contain only carbon, hydrogen, and oxygen. In most cases R will contain only carbon and hydrogen but will also contain oxygen in the case of a hydroxy fatty acid such as 12-hydroxystearic acid. An additional reason why the R radical can contain oxygen is stated below.

It is not essential that the R radical in the triglyceride contain only carbon, hydrogen, and oxygen for triglycerides treated according to conventional techniques can also be used in practicing the invention. Most of these conventional treatments, which are also conventionally applied to fatty acids per se, involve a reaction at a double bond in the R radical. For example, triglycerides can be halogenated to add halogen, i.e., chlorine, bromine or iodine, at a double bond in the R radical. Such a reaction can be indicated as —CH=CH— + Cl$_2$ → —CHCl—CHCl—

The amount of halogen employed determines the total number of double bonds eliminated. Further conventional methods of modifying the R group in the triglyceride involve treatment with sulfur, sulfuric acid and oleum. These treatments have the effect of adding, to an unsaturated carbon atom, an atom of sulfur, an $HSO_4$ group, and an $HSO_3$ group respectively.

Fatty acid triglycerides are also conventionally treated in such a manner as to add hydrogen or oxygen to the triglyceride. One such method involves hydrogenation to saturate some or all of the double bonds in the R radicals. Another method involves oxidation to add an epoxy group at a double bond. This treatment can be indicated as

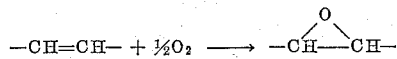

In spite of various modifications such as those described above, the R radical in the triglycerides suitable for the present purpose still contains 9–29, preferably 13–23, carbon atoms in a straight chain and the COO— group is attached to an end of such chain. This feature of the R radical characterizes all the R radicals in triglyceride and defines their suitability for the present purpose.

Even though triglycerides modified in conventional manner, such as by the methods described, are suitable for the present purpose, the preferred triglycerides are those containing unsaturation to the extent already specified. In some cases modification reduces the unsaturation below the preferred amount.

As described previously, adduction of a mixture of urea and molten paraffin wax can be prevented by dissolving in the molten paraffin wax a small amount of a fatty acid triglyceride. It is recognized that in a substantially homogeneous mixture of molten paraffin wax and the triglyceride, the latter may not be "dissolved" in the wax in the technical sense of the word. However, such a mixture has the appearance of a true solution and therefore is so referred to for the present purpose, i.e., in a homogeneous mixture of paraffin wax and fatty acid triglyceride, the latter is dissolved in the former.

The amount of fatty acid triglyceride used should of course be a stabilizing amount, i.e., the amount should be sufficient to prevent or at least substantially delay the adduction reaction. Since a dispersion of urea in molten paraffin wax will normally be processed into fertilizer particles the amount of fatty acid triglyceride employed should normally be sufficient to prevent adduction until such processing is effected. Whether the amount is sufficient is readily determined by observing whether a white precipitate forms when the solid urea and molten paraffin wax are mixed. More specifically, the amount of fatty acid triglyceride should normally be at least 0.25% based on the weight of molten paraffin wax, preferably at least 0.75%, more preferably at least 1%. Although amounts of fatty acid triglyceride as high as 10% can be used, preferably not more than 5% is used since it is usually desirable to minimize the amount of non-fertilizer ingredients in the slow release fertilizer. More preferably not more than 3% is used. As previously stated the amount of paraffin wax and urea will usually be 15–49 parts and 5–80 parts respectively, more frequently 25–49 parts and 20–70 parts respectively.

As stated above the amount of fatty acid triglyceride employed is preferably not more than 5%, more preferably not more than 3%. A distinct advantage of fatty acid triglycerides as adduct inhibitors is that they are effective in relatively small amounts. Fatty acids per se are also effective as adduct inhibitors but they are not nearly as efficient as fatty acid triglycerides. For example, when stearic acid is used to prevent adduction of a mixture of 60 parts urea and 40 parts paraffin wax, the stearic acid being used in amount of 5.3% by weight of the wax, adduction was delayed about six minutes. On the other hand when linseed oil was used as the adduct inhibitor in amount of 1% by weight of the wax adduction was delayed for more than one hour. Thus adduction was delayed at least about 9 times as long when only one-fifth the amount of inhibitor was used. Similarly, fatty acid triglycerides are distinctly superior to unsaturated fatty acids. The superiority of fatty acid triglycerides over fatty acids per se is shown more clearly in the subsequent examples.

The dissolution of the fatty acid triglyceride in the molten paraffin wax and the subsequent addition of urea (and any other fertilizer ingredients as the case may be) can be effected in any convenient manner. Preferably, the paraffin wax is heated to about 200° F. and the triglyceride is then added and the mixture stirred until the triglyceride dissolves in the paraffin wax. After the triglyceride has dissolved the temperature of the triglyceride paraffin wax solution is preferably lowered to slightly (e.g., 10°–20° F.) above the melting point of the paraffin wax. This is to eliminate any possibility of adduction. The adduction reaction occurs more readily at higher temperatures, hence reducing the temperature should aid in preventing it. Next the urea is charged to the paraffin wax-triglyceride mixture. If other fertilizer ingredients are to be included they are also added to the molten wax at this time. After dispersing the fertilizer ingredients in the mixture the dispersion can be formed into discrete particles in any convenient manner such as in a pellet mill, etc., after which the particles are cooled to obtain solid slow release fertilizer particles. As previously described the invention also embraces such slow release fertilizers, i.e., slow release fertilizers containing solid urea dispersed in solid paraffin wax, the paraffin wax having a fatty acid triglyceride dissolved therein.

An alternative but less preferable method of forming the dispersion is to charge the urea to the molten paraffin wax after which the triglyceride is then dissolved in the paraffin wax. This method is considerably less desirable since the urea may and frequently does react with the paraffin wax to form the adduct before the triglyceride can be dissolved in the paraffin wax. This problem is obviated by dissolving the triglyceride in the paraffin wax prior to the addition of urea.

The term paraffin wax is used throughout this specification in accordance with its conventional meaning. It is one of only two waxes obtainable from petroleum, the other being microcrystalline wax. The differences and similarities between these two kinds of wax are well known to those skilled in the art and are summarized in Bennett, Commercial Waxes, Chemical Publishing Co., (1950), pp. 84–88. Both paraffin and microcrystalline waxes contain mainly saturated paraffin hydrocarbons, the former containing mainly straight chain paraffins while the latter contains a substantial amount of branched chain paraffins. Some typical properties of paraffin and microcrystalline waxes are shown in Table I.

TABLE I

| Property | Paraffin wax | Microcrystalline wax |
| --- | --- | --- |
| Molecular weight | 250–500 | 500–800 |
| Melting point (ASTM D-127), °F | 110–165 | 140–210 |
| Viscosity at 210° F (ASTM D-446), S.U.S. | 30–50 | 60–100 |
| Penetration at 77° F. (ASTM D-1321—100 g., 5 sec.), dmm | 5–25 | 5–25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous. The invention is preferably applicable to the dispersion of urea in a paraffin wax having melting point, viscosity, and penetration within the ranges stated in Table I above. All wax properties specified herein are by the appropriate tests indicated in the above table.

The following examples illustrate the preparation of the composition of the invention and the benefits which can be obtained by the method of the invention.

*Example I*

40 parts of a paraffin wax having a melting point of 129° F., a penetration at 77° F. of 18 dmm., and a viscosity at 210° F. of 38 S.U.S. where charged to a mixing tank equipped with heating means. The wax was heated to 220° F. To the resulting molten wax 60 parts of commercial crystal urea were added with stirring. After all the urea was added stirring was continued. In about 45 seconds the entire contents of the mixing tank became a solid having about the texture of wet sand. The solid was analyzed by X-ray diffraction and differential thermal analysis and was found to contain a substantial amount of a urea-paraffin wax adduct, a small amount of paraffin wax, and essentially no free urea.

*Examples II–XI*

The procedure was the same as in Example I except that part of the paraffin wax was replaced with either a fatty acid per se or a fatty acid triglyceride as an adduct inhibitor. The inhibitor was dissolved in the molten paraffin wax at about 210° F. prior to the addition of urea. The amount of urea, wax, and inhibitor, the latter both as parts and as a percentage of the wax, and the specific inhibitor employed are shown in Table II below. The dispersion of urea in the wax-inhibitor solution was stirred until adduction occurred unless it did not occur after one hour in which case the experiment was ended. The time which elapsed before adduction occurred is shown in Table II as adduction time. Failure of adduction to occur within one hour is indicated by the statement "1 hour+." The result of Example I is also included in Table II for ready comparison. In those examples shown in Table II in which adduction had not occurred in one hour the dispersion was fluid at the end of the one-hour period and could be shaped into fertilizer particles in any convenient manner such as by means of a mold, etc.

TABLE II

| Example | Parts urea | Parts wax | Inhibitor used | Parts inhibitor | Inhibitor as percentage of wax | Adduction time |
|---|---|---|---|---|---|---|
| 1 | 60 | 40 | None | | | 0.75 min. |
| 2 | 60 | 38 | Stearic acid | 2 | 5.3 | 7 min. |
| 3 | 60 | 39.6 | do | 0.4 | 1.0 | 1 min. |
| 4 | 60 | 36.4 | do | 3.6 | 10.0 | 1 hr. + |
| 5 | 60 | 39.6 | Oleic acid | 0.4 | 1.0 | 4 min. |
| 6 | 60 | 39.0 | do | 1.0 | 2.5 | 6 min. |
| 7 | 60 | 39.6 | Tung oil | 0.4 | 1.0 | 1 hr. + |
| 8 | 60 | 39.6 | Linseed oil | 0.4 | 1.0 | 1 hr. + |
| 9 | 60 | 39.6 | Castor oil | 0.4 | 1.0 | 1 hr. + |
| 10 | 60 | 39.6 | Sulfurized lard oil. | 0.4 | 1.0 | 1 hr. + |
| 11 | 60 | 39.6 | Hydrogenated castor oil. | 0.4 | 1.0 | 1 hr. + |

It is evident from the data contained in Table II not only that fatty acid triglycerides are effective in preventing or at least substantially delaying adduction, but also that they are distinctly more effective than either saturated or unsaturated fatty acids per se. Similar results are obtained when other fatty acid glycerides of the types described herein are employed. The results are similar in that the adduction reaction is prevented or at least delayed for a substantial period of time.

Typical analyses of the fatty acid triglycerides used in Examples VII–XI are as follows:

Tung oil:
    5.5% saturated fatty acids
    15.0% oleic acid
    79.5% eleostearic acid Sulfurized lard oil: Equivalent to lard oil which has been treated with elemental sulfur so that the amount of combined sulfur is equivalent to about 1 mole per mole of unsaturated fatty acid. A typical analysis of lard oil has been given hereinbefore.

Linseed oil:
    8.5% palmitic and stearic acids
    5% oleic acid
    61.5% linoleic acid
    25.0% linolenic acid Castor oil:
    87.8% ricinoleic acid
    3.6% linoleic acid
    8.0% oleic acid
    0.3% stearic acid Hydrogenated castor oil: Equivalent to castor oil in which all unsaturated fatty acids have been fully hydrogenated.

The invention claimed is:

1. Method of forming a slow release fertilizer comprising a dispersion of solid urea in a solid paraffin wax which when in molten state normally reacts with solid urea to form a urea-paraffin wax adduct which comprises (1) heating said paraffin wax to above its melting point whereby molten paraffin wax normally susceptible to adduction is obtained, (2) dissolving in said molten paraffin wax an adduct inhibitor consisting essentially of a material selected from the group consisting of fatty acid triglycerides having the formula

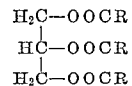

wherein each RCOO— group represents the RCOO— group of a fatty acid having the formula RCOOH wherein R contains 9–29 carbon atoms in a straight chain and in which the COOH group is attached to an end of such chain, the amount of said fatty acid triglyceride being 0.25–10.0% by weight of said molten paraffin wax, (3) dispersing solid urea in the molten paraffin wax containing said adduct inhibitor dissolved therein, and (4) cooling the resulting dispersion to below the melting point of said paraffin wax, whereby a slow release fertilizer comprising a dispersion of solid urea in solid paraffin wax is obtained.

2. Method according to claim 1 wherein at least 50% of the fatty acids in said fatty acid triglyceride are unsaturated fatty acids.

3. Method according to claim 1 wherein the amount of said fatty acid triglyceride is 0.75–5.0%.

4. Method according to claim 1 wherein at least 50% of the fatty acids in said fatty acid triglyceride are unsaturated fatty acids containing more than one double bond.

5. Method according to claim 1 wherein the amount of urea is 5–80 parts and the amount of molten paraffin wax is 15–49 parts.

6. Method according to claim 1 wherein R contains 13-23 carbon atoms in a straight chain.

References Cited by the Examiner
UNITED STATES PATENTS

| | | | |
|---|---|---|---|
| 2,175,083 | 10/39 | Keil | 71—64 |
| 2,936,226 | 5/60 | Kaufman et al. | 71—64 |
| 3,014,783 | 12/61 | Young | 71—64 |
| 3,024,098 | 3/62 | Austin et al. | 71—64 |

DONALL H. SYLVESTER, *Primary Examiner.*

ANTHONY SCIAMANNA, *Examiner.*